(12) United States Patent
Santha

(10) Patent No.: US 7,029,208 B1
(45) Date of Patent: Apr. 18, 2006

(54) BIODEGRADABLE SEDIMENT BARRIER

(76) Inventor: B. Lanka Santha, 355 Toccoa Pl., Jonesboro, GA (US) 30236

( * ) Notice: Subject to any disclaimer, the term of this patent is extended or adjusted under 35 U.S.C. 154(b) by 0 days.

(21) Appl. No.: 11/061,953

(22) Filed: Feb. 17, 2005

(51) Int. Cl.
*E02B 3/04* (2006.01)
*E02D 17/20* (2006.01)

(52) U.S. Cl. ............ 405/302.6; 405/302.7; 405/15

(58) Field of Classification Search ......... 405/302.6, 405/302.7, 15
See application file for complete search history.

(56) References Cited

U.S. PATENT DOCUMENTS

| | | | | |
|---|---|---|---|---|
| 5,338,131 A | * | 8/1994 | Bestmann | 405/15 |
| 5,595,458 A | * | 1/1997 | Grabhorn | 405/302.6 |
| 5,605,416 A | | 2/1997 | Roach | |
| 5,997,213 A | * | 12/1999 | Dennis et al. | 405/15 |
| 6,109,835 A | * | 8/2000 | Grabhorn | 405/302.6 |
| 6,547,493 B1 | * | 4/2003 | Spangler et al. | 405/302.6 |
| 6,616,383 B1 | * | 9/2003 | Janz | 405/302.7 |
| 6,709,202 B1 | * | 3/2004 | Spangler et al. | 405/302.6 |

OTHER PUBLICATIONS

California Stormwater Quality Association, Stormwater Best Management Practice Handbook, Jan. 2003, 614 pages, United States.

* cited by examiner

*Primary Examiner*—Frederick L. Lagman
(74) *Attorney, Agent, or Firm*—Weatherly Kerven LLC; Mitchell G. Weatherly; David S. Kerven

(57) ABSTRACT

The present application relates to systems and methods for making and using sediment barrier. More specifically the present application relates to systems and methods for using sediment barriers to reduce pollution of rivers and streams from sediment resulting from soil erosion at, for example, a construction site or other area of potential soil erosion. The sediment barrier typically includes at least one apron that serves to provide filtering, water velocity reduction and/or anchoring. The sediment barrier further includes a body portion that provides substantial filtering of sediment from water passing therethrough. The apron and/or body portions of the barrier are preferably composed of biodegradable material.

20 Claims, 7 Drawing Sheets

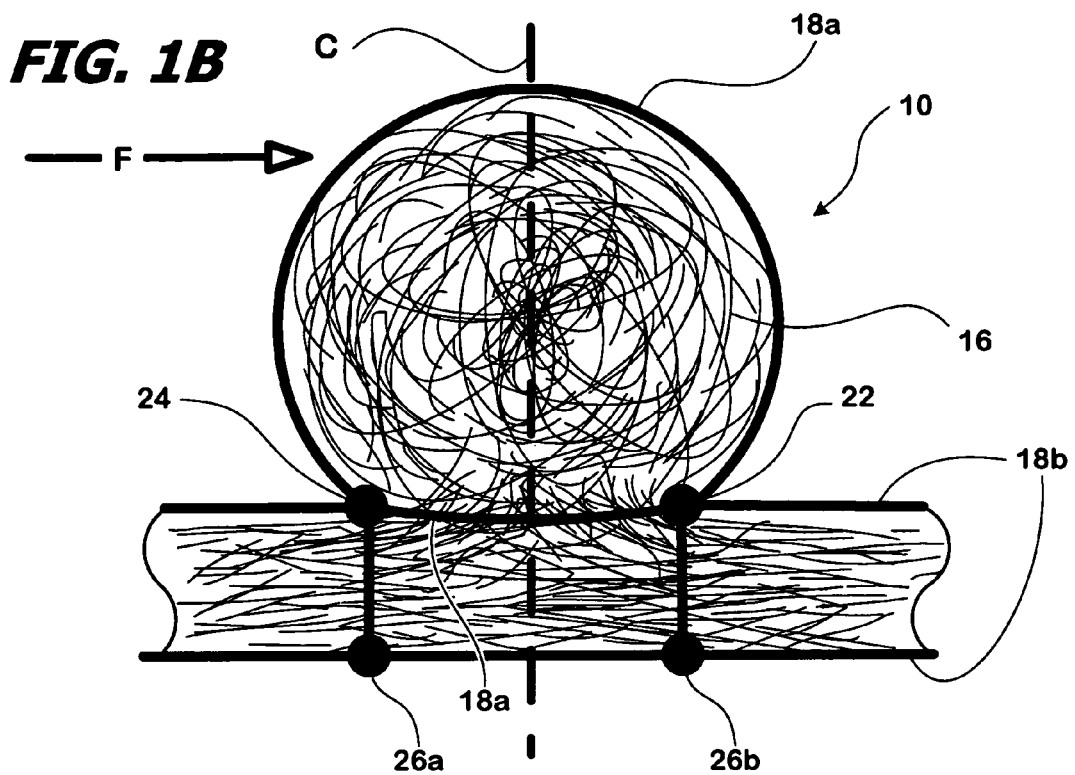
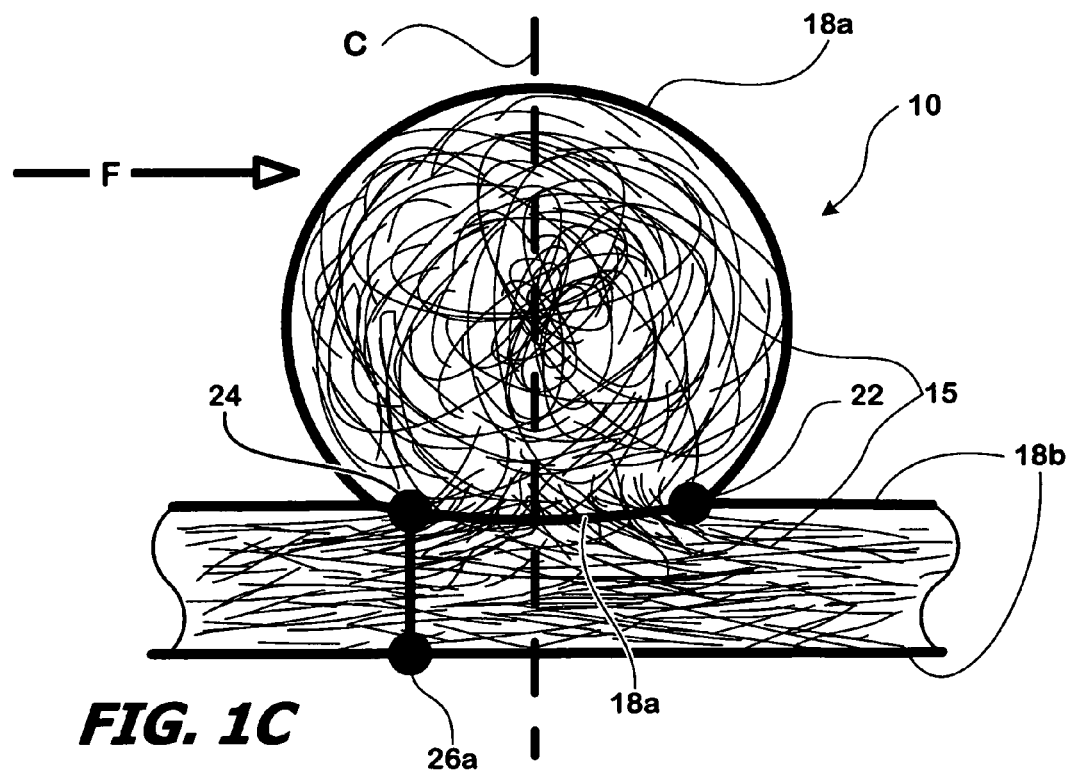

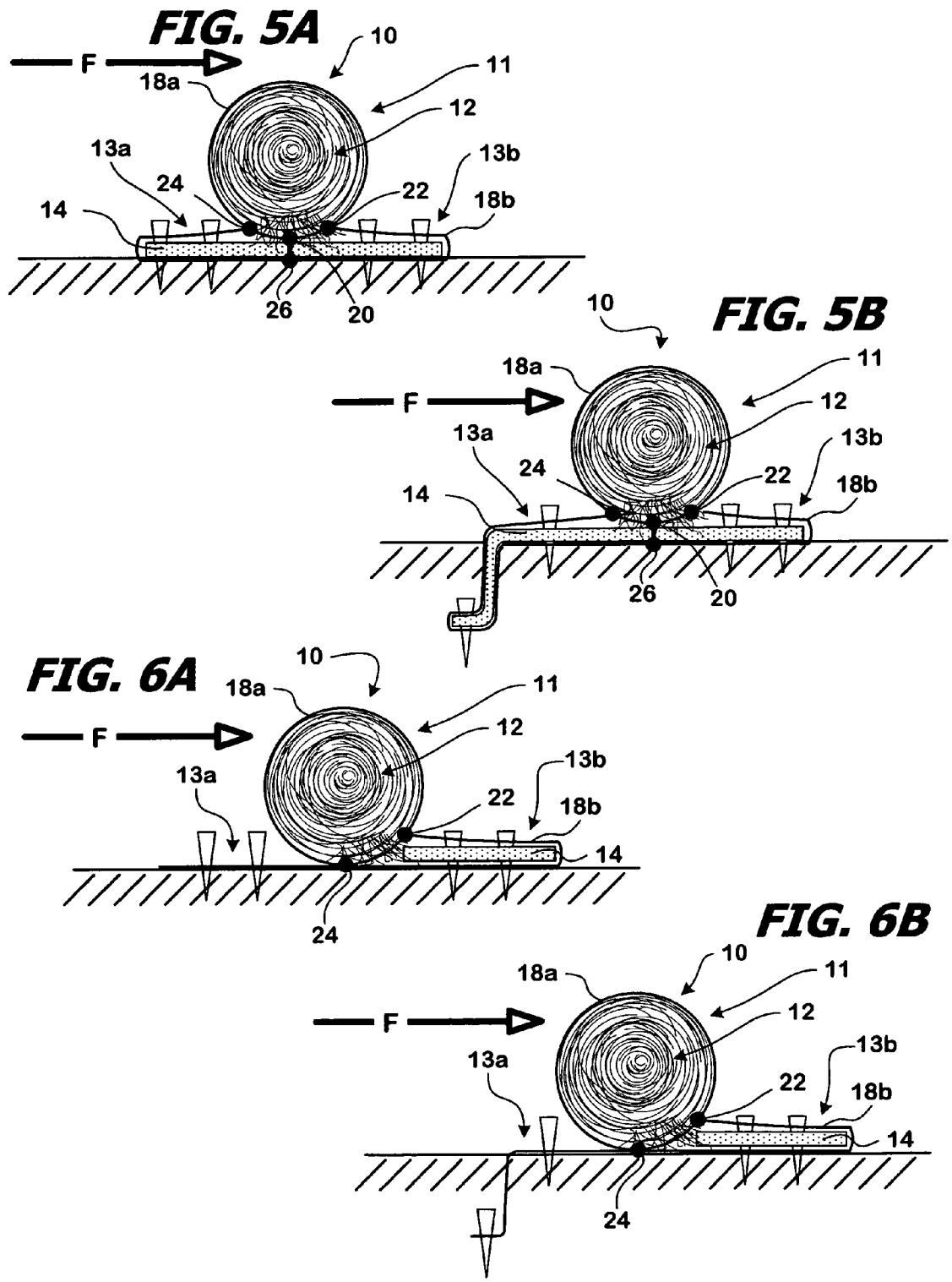

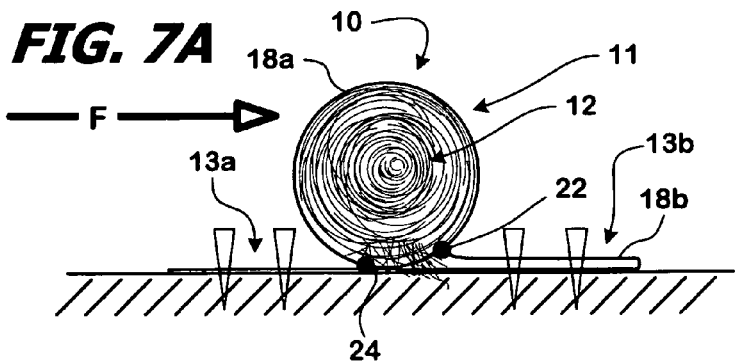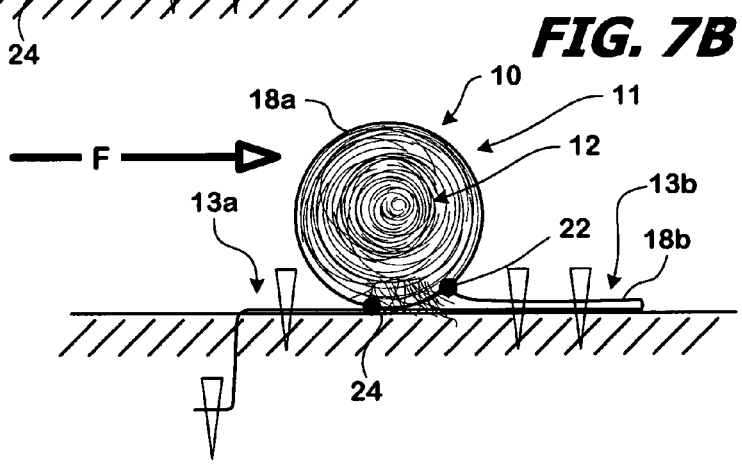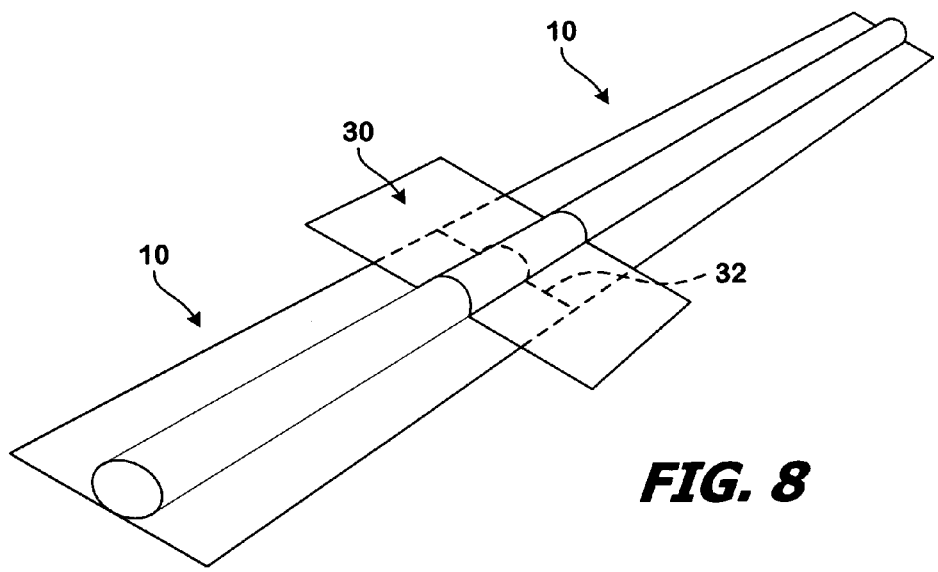

BIODEGRADABLE SEDIMENT BARRIER

BACKGROUND

This application relates to systems and methods for removing and trapping sediment entrained in moving water so that the sediment does not enter and pollute the local streams and rivers network. Such systems are typically called "check dams" or sediment barriers. More specifically, the invention relates to biodegradable modular structures from which sediment barrier structures may be constructed.

It is very common to see bare soil slopes and drainage waterways near highways and constructions sites. When water flows quickly over exposed soil waterways and down slopes before vegetation covers the bare soil, the flow erodes the soil and carries the eroded soil and deposits the soil as sediment in surrounding natural waterways. If these sediments were not removed before they reached the natural waterways, they would pollute those waterways. Therefore, effective sediment control has become a major task in construction sites. To protect natural watersheds from polluting sediment, regulatory agencies like the U.S. Environmental Protection Agency have toughened regulations and strictly enforced those regulations, which has added to the demand for sediment control devices.

Various types of sediment control devices are now available. However, conventional sediment barriers do not perform well on all three factors. Conventional devices for controlling erosion and sediment on construction sites include sediment barriers made of hay bales, silt fences, rocks, stuffed fiber rolls, and a silt barrier with a triangular cross section (e.g., U.S. Pat. No. 5,605,416). These dams are placed at regular intervals in drainage ditches and on slopes to reduce the velocity of the water flowing over and through them and remove sediment entrained in the water.

The effectiveness of a sediment barrier structure is determined by, among other factors, its ability to: (1) remove a large percentage of sediment from water flowing through and/or over the dam, (2) accumulate a large volume of sediment before its ability to remove sediment degrades, and (3) become quickly integrated into the environment without interfering with the natural processes of the ecosystem in which it is installed. Efficiency, eco-friendliness, and cost are important factors to consider when selecting sediment control devices. Efficiency of a sediment control device relates to how well it blocks or traps sediment while allowing sediment free water to pass through and to the length of its functional life. Failure to account for functional life of a sediment control device could lead to serious problems during its applications.

Conventional sediment barriers do not perform well on all three factors. For example, sediment barriers made using fabric silt fences clog easily. The water flows through the fabric in the direction approximately perpendicular to the fabric surface and sediment collects in the fabric. Because the fabric is thin, it has little capacity to hold sediment before the spaces between fibers in the fabric becomes clogged.

In addition it is not that easy to remove a sediment barrier once sediment is deposited on it. Rock sediment barriers do not promote vegetation and they look very ugly in the middle of a waterway or on a slope in which vegetation has started to grow. Rock dams are also very hard to maintain since rocks tend to move when subjected to heavy flow conditions.

Dams made using hay bales or stuffed fiber rolls sometimes permit water to flow under the dam structure, which is sometimes called "under cutting." Under cutting compromises the effectiveness of the dam because the water flowing under the dam erodes the soil under the dam and creates an unimpeded flow path. If the erosion caused by under cutting is severe, the velocity and volume of water flowing under the dam may cause the dam to fail.

Additionally, many conventional sediment barriers do not promote the growth of vegetation on and/or near the installation site. Because conventional dams either completely block the flow of water through them or quickly clog with sediment, a "pond" forms behind the dam soon after it is installed. The water in the pond impedes growth of most vegetation in the soil covered by the pond. Moreover, as rain and other sources of water flow into the pond at varying rates, the size of the pond behind a conventional dam changes. As the pond covers more soil, it may kill vegetation that had previously started growing on "dry" soil. A long dry spell can let the pond drain and allow vegetation to grow. However, if a new pond forms, the vegetation may die. Therefore, conventional sediment barriers typically impede growth of vegetation in the area behind the dam.

Virtually all sediment barriers in the form of continuous barriers and diversion dikes are quickly buried under the accumulated sediment that they remove from passing water. Whenever a buried sediment barrier is made of materials that are not 100 percent biodegradable, the dam must be removed soon after the dam stops removing sediment. Removing sediment barriers is labor intensive and expensive and disturbs the soil. Disturbing the soil increases the risk that erosion will recur at the site from which the dam was removed. Moreover, sediment-clogged sediment barriers are typically disposed of landfills, which consumes increasingly scarce landfill space.

SUMMARY

Sediment barriers described below perform as well as or better than conventional dams in connection with each of the three criteria described above. Such a sediment barrier reduces the velocity of flowing water at least as effectively as conventional dams. Such a sediment barrier also filters water more effectively than conventional dams by permitting sediment-bearing water to flow into and through the aprons and body of the barrier. The sediment barrier filters water in its body and an apron that mostly lays flat on the surface surrounding the body of the barrier. The upstream apron of the sediment barrier prevents the under cutting (i.e., water flowing under the dam) by covering and protecting the soil immediately upstream of the body from erosion. Additionally, the upstream apron filters and collects sediment from any water that may flow through that portion the apron. Therefore, any small flow through this portion of the apron will cease when sufficient sediment has been deposited in the apron to obstruct any such flow. The sediment that collects in the upstream apron also tends to anchor the apron and therefore the barrier in position. When sufficiently high volume flow is present, water will flow through and/or over the body of the barrier. When sediment-bearing water overflows the barrier, the downstream portion of the apron collects additional sediment in substantially the manner described in connection with the upstream portion of the barrier.

A sediment barrier as described below lets water flow through the barrier more readily than conventional barriers. When water passes through the barrier, the barrier filters the water and collects sediment inside the body and apron. Because water can flow through the barrier, the water behind the barrier does not rise as fast or reach the same level that it would if a conventional barrier were installed. The apron in the barrier having a fiber core begins collecting sediment from the upstream flow immediately. The apron collects some of the sediment by filtering the sediment from flow through the apron core. The apron also collects some of the sediment through friction between the flowing water and the surface of the upstream apron. This friction slows the flow enough that some of the heavier sediments settle out. The body of the barrier further slows the water flow by presenting a semi-permeable physical barrier to the flow. The body core permits some water to pass at very low relative velocities and filters sediment in the process so that water passing out of the downstream side of the barrier is substantially free of sediment.

Because the sediment barrier structures are constructed of biodegradable materials, they need not be removed from the installed location. Sediment barriers made with the modular structures also promote the growth of vegetation in and near the area in which the sediment barrier structure traps sediment. As vegetation grows in and near the sediment barrier, the barrier's ability to collect sediment is enhanced and the sediment barrier is integrated faster into the surrounding ecosystem.

When water flows at high enough rates to exceed the filtering capacity of the barrier, water flows over the top of the barrier (i.e., the top of the body) and contacts the downstream portion of the apron. The downstream portion of the apron includes a core made of coir fiber mat material covered with netting woven of coir twine. When the sediment-bearing flow reaches the downstream portion of the apron, that portion of the apron removes sediment in substantially the same manner described above in connection with the upstream portion of the apron having a fiber core.

One hundred percent of the material in the described barrier is biodegradable natural material. The preferred material is coconut fiber (coir) which is durable. Therefore, when sediment is deposited on the upstream apron it is not required to be removed at the end of the project. When it is use in the field, the described barrier does not create an upstream pond. This leads to quick drying in the surrounding area allowing vegetation growth without problem of water logging. It also eases movement of construction equipment without getting into wet soils. A rough surface of the aprons, especially downstream, breaks the flow velocity and trap sediment, if any. Furthermore, since current invention is made of one hundred percent natural biodegradable material, it does not require removing at the end of a project. This allows vegetation to grow on its aprons as well as the body as soon as it is installed. Furthermore, it does not need to be disposed in to a landfill at the end of its functional life. It can be left at the site or bury in the soil. Furthermore, when it is used with conjunction with vegetation, it assists the growth of vegetation by providing mulch, which retains moisture, from its decomposition at the end of its functional life.

Briefly, a sediment barrier as described includes one or more barrier segments, each of which includes substantially cylindrical body or roll attached to an apron. The body is attached to the apron such that the apron extends laterally from both sides of the body along substantially the entire length of the body. Alternatively, the apron may extend laterally from only one side of the body. A sediment barrier structure may be made in any length by connecting sediment barrier segments end to end.

The body includes a core of a substantially cylindrical bundle or roll of densely packed biodegradable material, preferably coconut (coir) fibers. The body is preferably a circular cylinder. However, other cylindrical or non-cylindrical shapes may be used. The body core is covered with a loosely woven netting of coir twine. The netting covering the body is woven of coir twine with a preferred spacing of about one to three inches.

The apron preferably also includes a core that is preferably a mat of densely packed biodegradable material, preferably needle-punched coir fibers. Most, if not all, the apron core is surrounded by a biodegradable netting, preferably woven of coir twine with a spacing similar to the spacing in the netting that surrounds the body core. In a preferred form, the netting that surrounds the apron is an extension of the netting that surrounds the body. Alternatively, portions of the apron may have no coir fiber core. Such portions are preferably constructed of a netting, preferably coir netting, having a tighter weave between the warp twine than the netting used to cover the portions of the apron having a core. A preferred spacing between the warp twine is about ¼ to ⅓ inches.

The body is connected to the apron by tying the netting that covers the body to netting that covers or constitutes the apron at points along one or more approximately linear paths extending in the same direction as the longitudinal axis of the body. The body is preferably connected to the apron along two or more such longitudinal paths and is more preferably connected along at least three longitudinal paths.

The foregoing general description and the following detailed description are exemplary and explanatory only and do not restrict the inventions as claimed below. The accompanying drawings, which are incorporated in and constitute a part of this specification, illustrate one or more systems and methods and together with the description, serve to explain the principles espoused in the present application.

BRIEF DESCRIPTION OF THE DRAWINGS

FIGS. 1B and 1C schematically illustrate alternative ways to secure the body of a sediment barrier segment according to the invention to the apron of the sediment barrier segment.

FIG. 5A is a schematic end view of one way of installing the sediment barrier of FIG. 1 in the bed of a drainage ditch.

FIG. 5B is a schematic end view of another way of installing the sediment barrier of FIG. 1 in the bed of a drainage ditch.

FIG. 6A is a schematic end view of one way of installing the sediment barrier of FIG. 3 in the bed of a drainage ditch.

FIG. 6B is a schematic end view of another way of installing the sediment barrier of FIG. 3 in the bed of a drainage ditch.

FIG. 7A is a schematic end view of one way of installing the sediment barrier of FIG. 4 in the bed of a drainage ditch.

FIG. 7B is a schematic end view of another way of installing the sediment barrier of FIG. 4 in the bed of a drainage ditch.

FIG. 8 schematic perspective view of two sediment barrier segments of FIG. 1 that are mated to end to end form a sediment barrier structure.

DETAILED DESCRIPTION

This application refers in detail below to the exemplary systems and methods, which may be illustrated in the accompanying drawings. Wherever possible, the application uses the same reference numbers throughout the drawings to refer to the same or similar items. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 1:
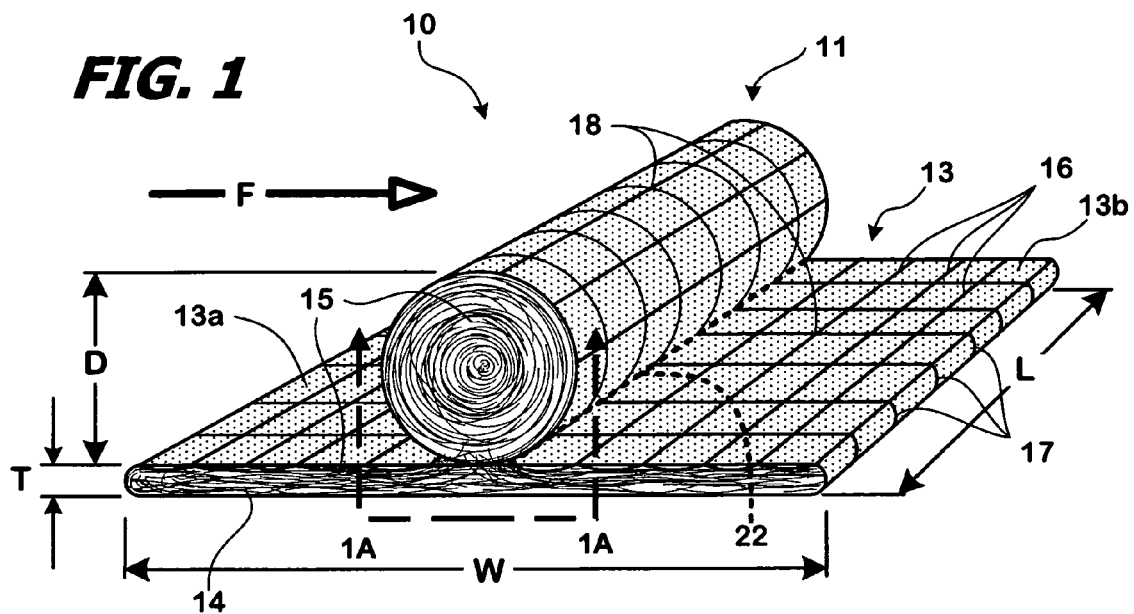
FIG. 1 is a front schematic perspective view of a sediment barrier segment.

FIG. 1 illustrates a sediment barrier segment 10 according to the present invention that generally includes a body 11 and an apron 13. The sediment barrier segment 10 has length L and width W. The body 11 is illustrated as a circular cylinder having diameter D and length L. However, the body 11 may have other cross sectional shapes (e.g., a square, ellipse, rectangle, or triangle, among others). The body 11 is attached to the apron 13, which is illustrated as a mat having width W and thickness T. The apron 13 includes two portions, an upstream apron 13a and a downstream apron 13b, each of which laterally extend along substantially the entire length of the body 11 from near the bottom of the body 11. Alternatively, the apron 13 may include only the upstream apron 13a or the downstream apron 13b. The body 11 and the apron 13 are surrounded by netting 18, which is preferably woven of biodegradable twine (e.g., coir twine). The netting 18 may be woven of warp twine 16 and weft twine 17. The body 11 is attached to the apron 13 at points along path 22 near the bottom of the body 11. The body 11 may also be attached to apron 13 at locations other than path 22, which are not shown in FIG. 1, but discussed in more detail below. For additional strength, the body netting at the bottom of the body 11 may be stitched through the apron core 14 to the netting on the bottom of the apron 13.

Figure 1A:
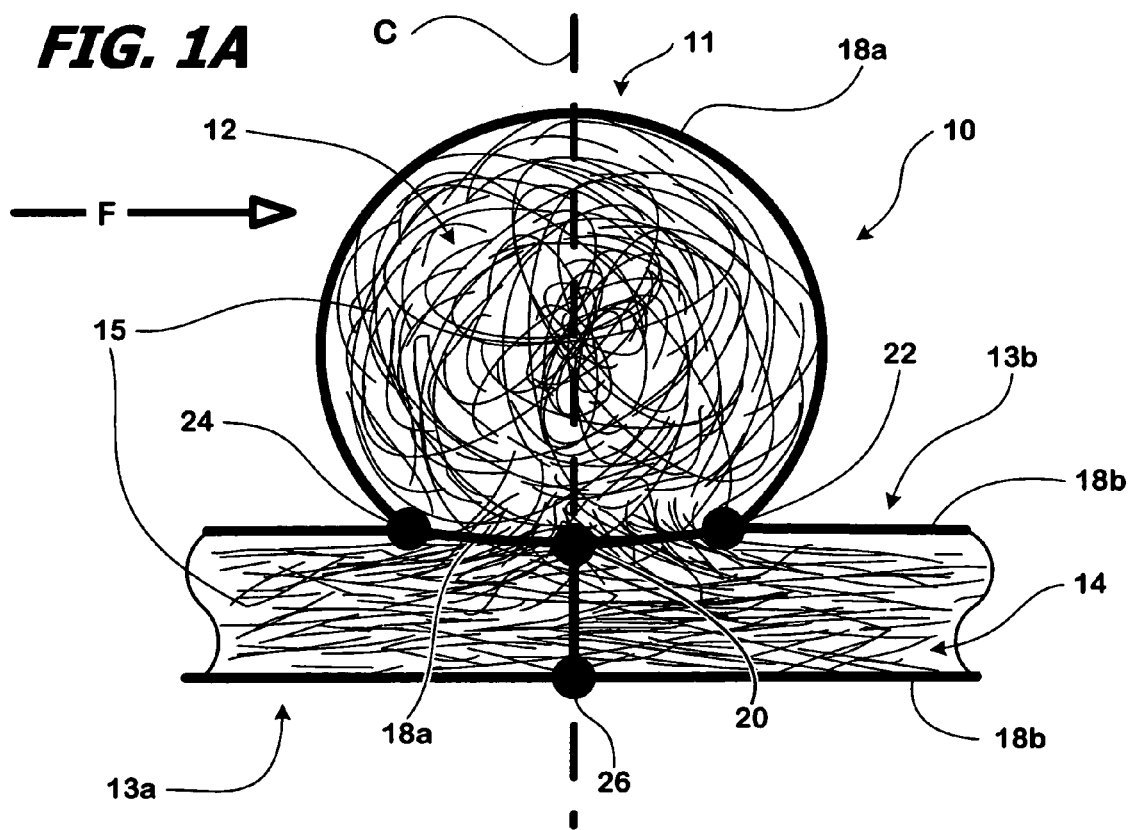
FIG. 1A is a partial cross-sectional view of the sediment barrier segment of FIG. 1 taken along line 1A—1A of FIG. 1.

As illustrated in FIG. 1A, the body 11 includes a body core 12, and the apron 13 includes apron core 14. FIG. 1A illustrates only the central section of apron core 14. The body core 12 and the apron core 14 are made of biodegradable fibers 15. The fibers used in body core 12 and apron core 14 are preferably coir fibers that permit water to flow through them while also filtering sediment from the water. As the fibers 15 filter sediment, the sediment collects in the spaces between fibers. The body core 12 and apron core 14 are encased within netting 18. More particularly, portion 18a of netting 18 surrounds body core 12, and portion 18b of netting substantially surrounds apron core 14. As illustrated netting portions 18a and 18b are portions of a single piece netting 18. Alternatively, netting portions 18a and 18b may be made from separate pieces of netting.

Netting portion 18a completely surrounds body core 12. Netting portion 18b as illustrated extends from point 22 across the top of downstream apron 13b, under downstream apron 13b and upstream apron 13a, and across the top of upstream apron 13a to point 24. Point 22 represents the end view of the path 22 illustrated in FIG. 1 and described in the accompanying text. Point 24 represents the end view of another path 24 (not illustrated in FIG. 1) at which apron 13 is attached to body 11. Path 24 is located on the opposite side of body 11 from path 22. Points 20 and 26 represent the paths at the bottom of body 11 and the bottom of apron 13 respectively along which the body 11 may be stitched to apron 13. The path corresponding to point 20 extends along substantially the entire length of the bottom of body 11 in the plane including centerline C and the longitudinal axis of body 11. The path corresponding to point 26 extends along substantially the entire length of the bottom of the apron 13 in the plane including centerline C and the longitudinal axis of body 11.

FIGS. 1B and 1C illustrate alternative versions of the attachment between body 11 and apron 13. In FIG. 1B, points/paths 22 and 24 are in the substantially the same locations as described in connection with FIGS. 1 and 1A. However, apron 13 is attached to body 11 by stitching the bottom of netting portion 18b along point/path 26a through apron core 14 to point/path 24. Apron 13 is also attached to body 11 by stitching netting portion along point/path 26b through apron core 14 to point/path 22. In FIG. 1C, the netting portion 18b surrounding apron 13 is tied to body 11 along point/path 22 as described in connection with FIGS. 1 and 1A. Additionally, apron 13 is attached to body 11 by stitching the bottom of netting portion 18b along point/path 26a through apron core 14 to point/path 24.

Figure 2A:
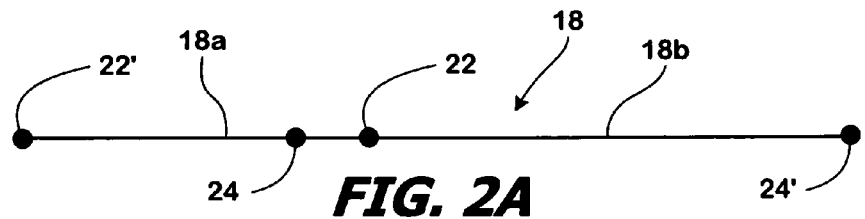
FIGS. 2A–2F are schematic end views of intermediate structures made when manufacturing the sediment barrier segment of FIG. 1.
Figure 2B:
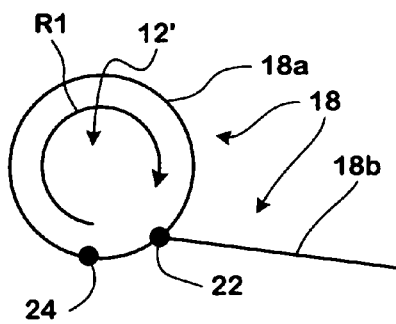
Figure 2C:
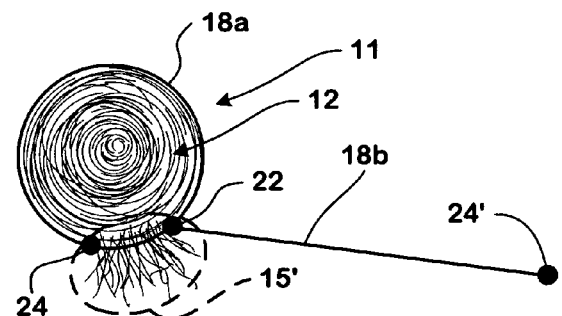
Figure 2D:
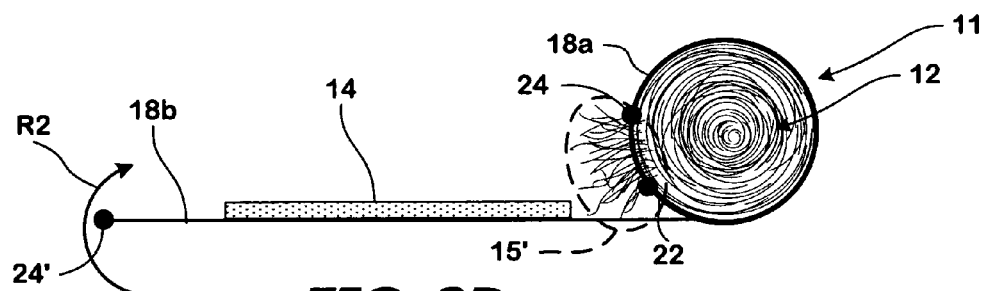
Figure 2E:
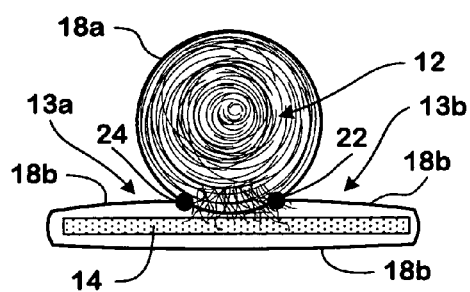
Figure 2F:
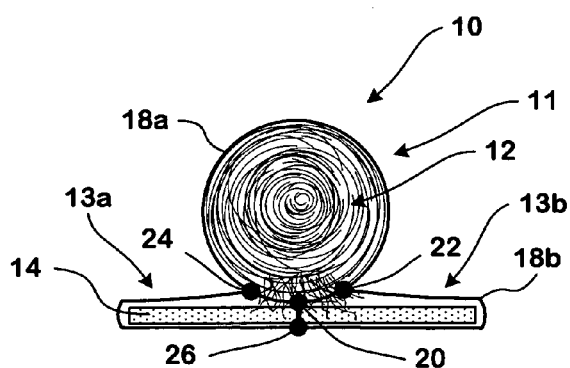

FIGS. 2A–2F schematically illustrate intermediate structures made when manufacturing the sediment barrier segment 10 of FIG. 1. The sediment barrier 10 may be made by beginning with a piece of netting 18, which is illustrated in FIG. 2A. As illustrated, the width of netting 18 is apparent but not the length of the netting (which corresponds to length L of the sediment barrier segment 10). The netting 18 is also illustrated with point/path 22, which divides netting 18 into portions 18a and 18b. Portion 18a eventually will surround body 11, and portion 18b will substantially surround apron 13. Point/path 22' corresponds to the edge of netting 18 that will eventually be tied to point/path 22. Attaching edge 22' on portion 18a is mated to point/path 22, as generally indicated by moving edge 22' in the direction indicated by the arrow R1 in FIG. 2B. When edge 22' and point/path 22 are attached, portion 18a forms a space 12' for body core 12. As shown in FIG. 2C, fibers 15 are stuffed into space inside portion 18a to form body core 12. A group of fibers 15' is left to protrude through portion 18a between points 22 and 24. Apron core 14, which is preferably formed of needle punched coir fiber matting, is positioned adjacent portion 18b as shown in FIG. 2D. Portion 18b is wrapped around apron core 14 as indicated by moving edge 24' in the direction indicated by the arrow R2, and edge 24' is attached to point/path 24 on portion 18a as shown in FIG. 2E. In this condition, fibers 15' contact the top of apron core 14 (see FIGS. 2E and 2F). These protruding fibers 15' assist in mating the body core 12 to the apron core 14 and ensure that no water can pass in the space between cores 12 and 14 without being filtered through coir fiber. The sediment barrier 10 is completed as shown in FIG. 2F by stitching the bottom of portion 18a to the bottom of portion 18b along point/paths 20 and 26 respectively. This stitching ensures that body core 12 and apron core 14 stay in close contact so that all water impinging upon the sediment barrier 10 is slowed and filtered. Once completed, sediment barrier segment 10 includes body 11, body core 12, apron 13 having upstream apron 13a and downstream apron 13b, and apron core 14.

Figure 3:
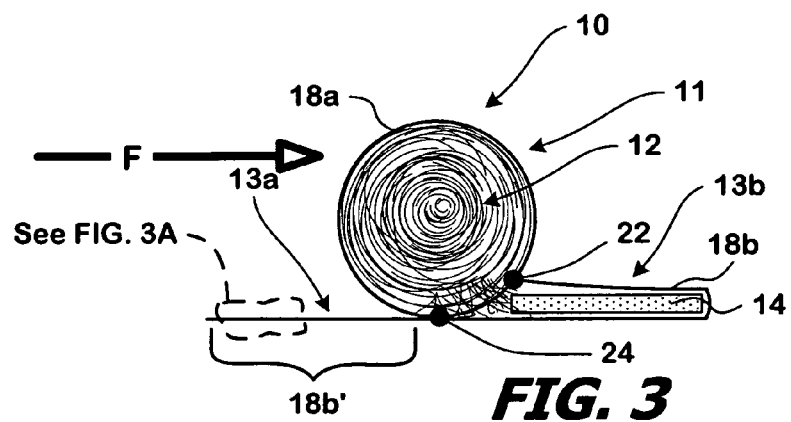
FIG. 3 is a schematic end view of an alternative version of a sediment barrier.

One alternative form of the sediment barrier segment 10 is illustrated in FIG. 3, which is a schematic end view. In the illustrated alternative, the apron core 14 is positioned only in downstream portion 13b of apron 13. The upstream portion 13a is formed by portion 18b' of netting 18. Another alternative form of the sediment barrier segment 10 is illustrated in FIG. 4, which is a schematic end view. In the illustrated alternative, the apron completely lacks apron core 14. In the illustrated segment 10, the entire bottom of apron 13 is formed by portion 18b" of netting 18.

Figure 4A:
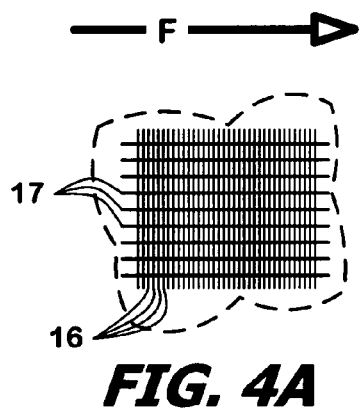
FIG. 4A is a partial detail plan view that schematically illustrates portions of the netting of the sediment barriers of FIGS. 3 and 4.
Figure 4:
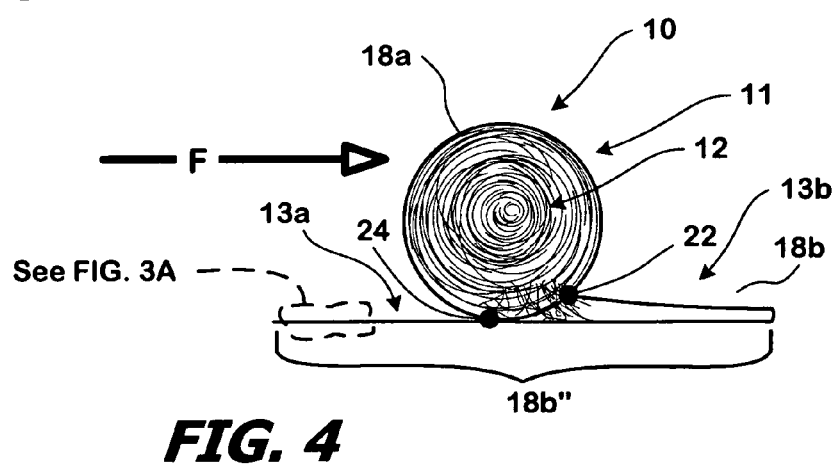
FIG. 4 is a schematic end view of another alternative version of a sediment barrier.

As shown in the exploded schematic view of FIG. 4A, netting portion 18b' (of FIG. 3) and netting portion 18b" (of FIG. 4) may be constructed using a tighter weave in which the spacing between twine 16 is smaller than the spacing between twine 17 and smaller than the spacing elsewhere in netting 18. The spacing between twine 16 is preferably about ¼ to /1;3 inches, and the spacing between twine 17 is preferably between about 1 and 3 inches. This tighter weave in the netting portion 18b' (of FIG. 3) and 18b" (of FIG. 4) more effectively slows the water that flows over upstream apron 13a (in both FIGS. 3 and 4) and in the downstream apron 13b (in FIG. 4) than the more open weave of the rest of netting 18. The tighter weave also increases the strength of the netting to increase the likelihood that the sediment barrier segment 10 remains anchored when water flows into the segment 10. The alternative sediment barrier segments 10 illustrated in FIGS. 3 and 4 contains less coir fiber 15 than the segment 10 illustrated in FIG. 1 and therefore costs less to manufacture.

FIG. 5A illustrates the segment of FIG. 1 installed in the basin of a drainage ditch with water flowing in direction F. The segment 10 is anchored to the bottom of the ditch using four wooden stakes, two through the upstream apron 13a and two through the downstream apron 13b. FIG. 5B illustrates an alternative way to anchor the upstream apron 13a. Namely, the leading edge of the upstream apron 13a is buried in a trench, anchored using a wooden stake, and the trench is filled to bury the anchor. FIGS. 6A and 6B illustrate similar installations of the sediment segment of FIG. 3. FIGS. 7A and 7B illustrate similar installations of the sediment segment of FIG. 4.

FIG. 8 illustrates how two segments 10 may be positioned end-to-end to form a longer sediment barrier structure. The segments 10 mate along line 32 and a coir fiber blanket 30 is laid across the top of the joint between the two segments. The entire structure including both segments 10 and the blanket 30 are secured to the soil using wooden stakes.

Figure 9:
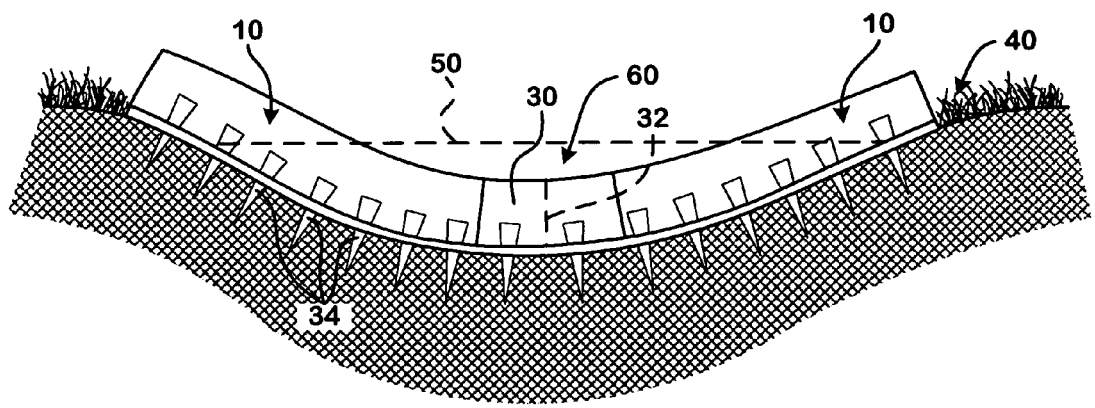
FIG. 9 is a schematic elevation view of the upstream side of a two-segment sediment barrier structure installed in a drainage ditch.

FIG. 9 illustrates how a two-segment sediment barrier structure may be installed in a drainage ditch 40. As in FIG. 8, two segments are mated end-to-end along line 32 and covered by coir fiber blanket 30. The water level in ditch 40 indicated by dashed line 50 is sufficiently high such that water will flow over the top of the structure in area 60.

The sediment barrier segments are sold in lengths of about 10, 15, and 25 feet with other lengths possible. The body 10 of the sediment barrier segment 10 is sold commercially in a circular cylinder form of 6, 9, or 12 inches in diameter. Other diameters are possible. The coir fiber 15 in the apron 13 and body 11 of the sediment barrier segment 10 provides structural stability and is an excellent medium for plant growth. After installation of a sediment barrier made using one or more barrier segments 10, desired native plants may be planted on or around the barrier where plants can get sufficient water. With time, sediment will be deposited in and around the barrier, which creates an excellent medium for riparian vegetation. The densely packed coir rolls typically collect sediment for 2–3 years and then they blend naturally with the existing environment.

Every section of a sediment barrier according to the invention performs the function of filtering sediment from the water that contacts the barrier. Immediately after installation of a barrier segment 10, the upstream apron 13a filters sediment from water that reaches that apron. As water accumulates behind the barrier and contacts the body 11, the body filters sediment from the water as it flows through the body core 12. Over time, filtered sediment accumulates in the upstream apron 13a and the body core 12. The accumulating sediment slowly reduces the filtering effectiveness of the upstream apron 13a and the body 11, which may cause the water level behind the barrier to rise enough to overflow the top of body 11. When water flows over the top of body 11, downstream apron 13b filters and collects sediment. Eventually, all three major parts of the barrier are impregnated with accumulated sediment. The accumulated sediment dramatically increases the weight of the barrier, which prevents water flowing into the barrier from dislodging the barrier. The accumulated sediment also serves as a very fertile base in which plants grow easily. As plants begin to grow in and around the sediment laden barrier, the plants consume the water adjacent the barrier. Eventually plants cover the entire area surrounding the barrier and water stops accumulating behind the barrier. At this point in time, the barrier is essentially fully integrated into the natural environment and no longer visible.

It will be apparent to those skilled in the art that various modifications and variations can be made in the systems and methods described in this application without departing from the scope or spirit of the invention. Other systems and methods will be apparent to those skilled in the art from their consideration of the specification and practice of the systems and methods disclosed in this document. The applicant intends that the specification and examples be considered as exemplary only, with the true scope and spirit of the invention being indicated by the following claims.

What is claimed is:

1. A biodegradable sediment barrier adapted to filter sediment from water that passes through the barrier, comprising:
   A. a body defining a longitudinal axis, an upstream surface facing an upstream direction, and a downstream surface facing a downstream direction, and comprising;
      i. a biodegradable fiber core;
      ii. a biodegradable body netting surrounding most of the fiber core, and
   B. an apron connected to the body that:
      i. comprises a biodegradable apron netting,
      ii. extends in at least the upstream direction to define an upstream apron portion, and
      iii. is attached to the body at a plurality of attachment points that define a first path
   along the body and a second path along the body that is spaced apart from the first path, and
   in which the first path and the second path are substantially parallel to the longitudinal axis.

2. A biodegradable sediment barrier according to claim 1, in which the apron also extends in the downstream direction to define a downstream apron portion.

3. A biodegradable sediment barrier according to claim 2, in which the upstream apron portion further comprises a biodegradable apron core inside the apron netting.

4. A biodegradable sediment barrier according to claim 3, in which the apron core is also located inside the apron netting in the downstream apron portion.

5. A biodegradable sediment barrier according to claim 1, in which the apron further comprises a biodegradable apron core inside the apron netting in the upstream apron portion.

6. A biodegradable sediment barrier according to claim 5, in which the apron also extends in the downstream direction to define a downstream apron portion.

7. A biodegradable sediment barrier according to claim 6, in which the apron core is also located inside the apron netting in the downstream apron portion.

8. A biodegradable sediment barrier according to claim 5, in which a plurality of fibers from the fiber core protrude into the apron core.

9. A biodegradable sediment barrier according to claim 1, in which the first path is located where the upstream surface touches the upstream apron portion.

10. A biodegradable sediment barrier according to claim 2, in which the first path is located where the upstream surface touches the upstream apron portion.

11. A biodegradable sediment barrier according to claim 2, in which the second path is located where the downstream surface touches the downstream apron portion.

12. A biodegradable sediment barrier according to claim 11, in which the first path is located where the upstream surface touches the upstream apron portion.

13. A biodegradable sediment barrier according to claim 12, in which the plurality of attachment points further defines a third path along the body that is:
   A. located between the first path and the second path and
   B. substantially parallel to the longitudinal axis.

14. A biodegradable sediment barrier according to claim 1, in which:
   A. the apron netting is woven of a warp twine in the longitudinal direction and a weft twine in a perpendicular direction to the longitudinal direction, and
   B. the spacing between immediately adjacent sections of warp twine in the upstream apron portion is smaller than the spacing between immediately adjacent sections of weft twine in the upstream apron portion.

15. A biodegradable sediment barrier according to claim 14, in which the apron also extends in the downstream direction to define a downstream apron portion.

16. A biodegradable sediment barrier according to claim 15, in which:
   A. the downstream apron portion further defines:
      i. an upper downstream apron portion that is attached to the body along the second path and
      ii. a lower downstream apron portion that is folded under the upper downstream portion and attached to the body along the first path, and
   B. the lower downstream apron portion is woven such that the spacing between immediately adjacent sections of warp twine is smaller than the spacing between immediately adjacent sections of weft twine.

17. A biodegradable sediment barrier according to claim 15, in which the apron further comprises a biodegradable apron core inside the downstream apron portion.

18. A biodegradable sediment barrier according to claim 16, in which:
   A. the upstream apron portion further comprises:
      i. an upper upstream apron portion that is attached to the body along the first path and
      ii. a lower upstream apron portion that is folded under the upper upstream portion and attached to the body along the second path, and
   B. the apron further comprises a biodegradable apron core inside the upstream apron portion.

19. A method of making a biodegradable sediment barrier, comprising the steps of:
   A. bundling a plurality of biodegradable fibers into a cylindrical body that defines a longitudinal direction;
   B. attaching a first edge of a biodegradable netting to the body along a first path that extends in the longitudinal direction on the surface of the body;
   C. wrapping the netting around the cylindrical body so that a first attachment portion of the netting spaced apart from the first edge contacts the first edge;
   D. attaching the first attachment portion to the body along the first path;
   E. attaching a second attachment portion of the netting that is located farther away from the first edge than the first attachment portion to the body along a second path that is spaced apart from the first path.

20. The method of making a biodegradable sediment barrier according to claim 19, in which the second attachment portion corresponds to a second edge of the netting that is opposite the first edge.

* * * * *